No. 726,152. PATENTED APR. 21, 1903.
E. B. FISK.
MOWING MACHINE.
APPLICATION FILED DEC. 17, 1902.
NO MODEL.
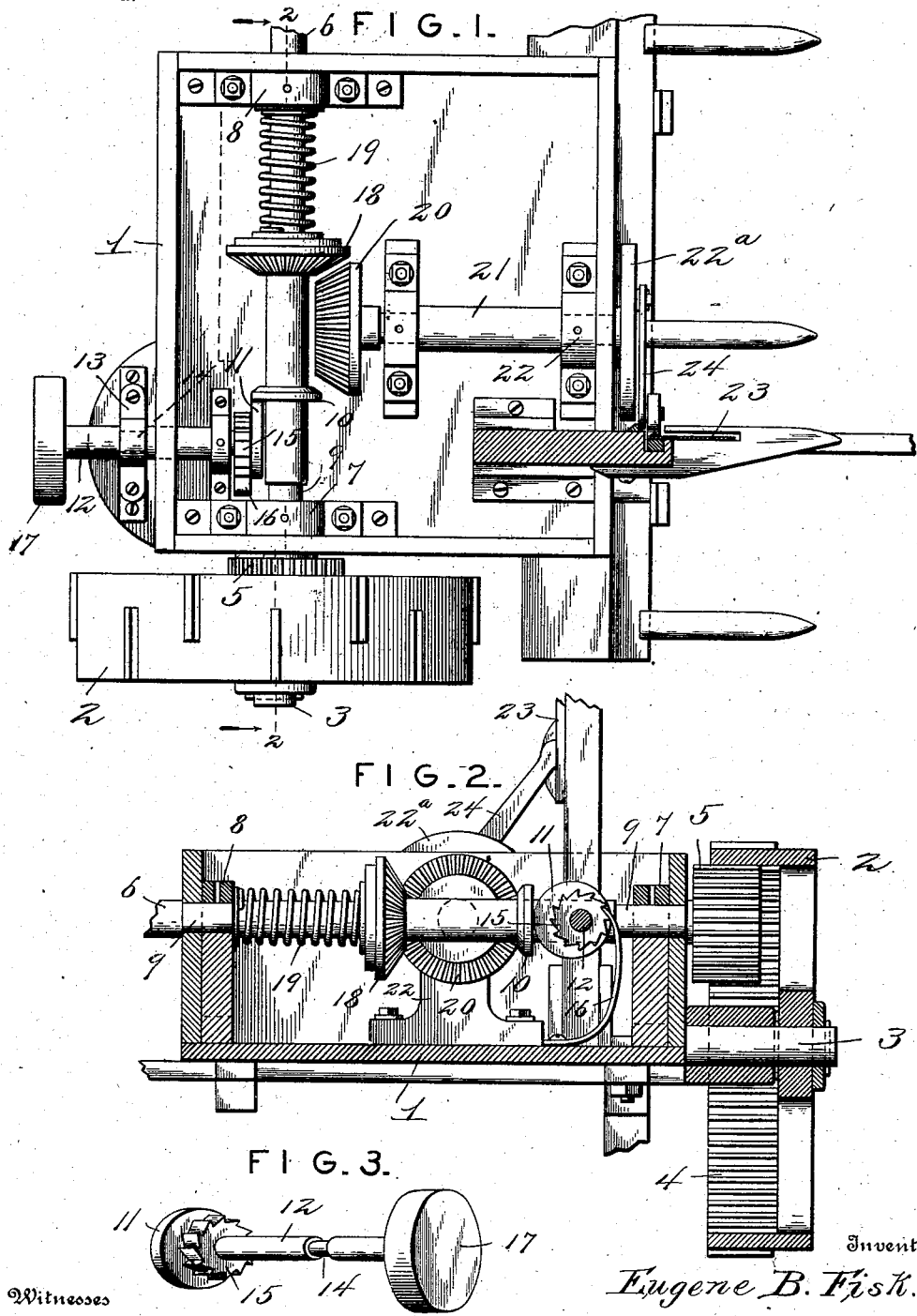
Witnesses
Harry L. Amer
Herbert D. Lawson
Inventor
Eugene B. Fisk.
By Victor J. Evans
Attorney

UNITED STATES PATENT OFFICE.

EUGENE B. FISK, OF WEST NASHVILLE, TENNESSEE.

MOWING-MACHINE.

SPECIFICATION forming part of Letters Patent No. 726,152, dated April 21, 1903.

Application filed December 17, 1902. Serial No. 135,558. (No model.)

*To all whom it may concern:*

Be it known that I, EUGENE B. FISK, a citizen of the United States, residing at West Nashville, in the county of Davidson and State of Tennessee, have invented new and useful Improvements in Mowing-Machines, of which the following is a specification.

My invention relates to new and useful improvements in mowing-machines, and more particularly to cutter-bar-operating mechanism; and its object is to provide means of simple and inexpensive construction whereby the cutter-bar may be quickly thrown into or out of operative relation to its driving mechanism.

With the above and other objects in view the invention consists in providing the power-shaft with a slidable pinion which is adapted to be thrown into or out of engagement with a pinion on the cutter-bar-operating shaft by means of an eccentric secured to a revoluble spindle and having means for holding it in the position to which it is moved.

The invention also consists in the further novel construction and combinations of parts hereinafter more fully described and claimed, and illustrated in the accompanying drawings, showing the preferred form of my invention, and in which—

Figure 1 is a plan view of the cutter-bar-operating mechanism and its shifting device, the vertical cutter being shown in section. Fig. 2 is a section on line 2 2, Fig. 1; and Fig. 3 is a detail view of the shifting eccentric and its spindle.

Referring to the figures by numerals of reference, 1 is the frame of the machine, having a traction-wheel 2, mounted on a short shaft 3, extending therefrom. The inner periphery of the traction-wheel is provided with gear-teeth 4, adapted to mesh with a gear 5, secured to and revoluble with a power-shaft 6, slidably mounted in suitable bearings 7 and 8 upon the frame 1. Those portions of shaft 6 journaled in the bearings are preferably reduced in diameter, as shown at 9, in order to limit the longitudinal movement of the shaft.

A collar 10 is arranged on shaft 6 and normally contacts with the periphery of a disk 11, eccentrically mounted at one end of a spindle 12, arranged at right angles to said shaft 6. Suitable bearings 13 are provided for the spindle, and any desired means, as a reduced wear-surface 14, is provided for preventing longitudinal movement thereof. A ratchet 15 is secured to the spindle 12, adjacent to the eccentric 11, and is engaged by a spring-pawl 16, which serves to prevent the revolution of the spindle except in one direction. A knob 17 or other suitable means is arranged at the outer end of spindle 12, whereby the same may be readily turned by hand.

A pinion 18 is secured to and revoluble with the shaft 6 and bears upon one end of a spring 19, coiled about shaft 6, and bearing at its opposite end upon the bearing 8. The spring serves to hold the shaft 6 normally pressed forward, with its collar 10 in contact with the eccentric 11. It also holds gear 18 normally in engagement or mesh with a similar gear 20, secured to a short shaft 21, arranged at right angles to shaft 6 and journaled in suitable bearings 22. A disk $22^a$ is secured to this shaft and is connected to the reciprocating cutter-bar 23 by means of a pitman 24. Any other desired means, however, may be employed for transmitting power from shaft 21 to the cutter-bar.

It will be understood that gears 5 and 18 and their shaft 6 are revolved continuously during the revolution of the traction-wheel 2. Motion is imparted to cutter-bar 23 from this shaft through gears 18 and 20, shaft 21, and pitman 24. When, however, it is desired to disconnect the cutter-bar and render it inoperative during the revolution of the traction-wheel, the spindle 12 is partly turned by means of knob 17, causing the eccentric 11 to swing against collar 10 and force it and the shaft 6 longitudinally, thereby compressing spring 19 and removing gear 18 from mesh with gear 20. The pawl 16 holds the eccentric in this position. When the revolution of the eccentric is continued, the spring 19 returns the parts to their normal positions.

It will be understood that the longitudinal movement of shaft 6 is not sufficient to withdraw gear 5 from engagement with the teeth of wheel 2.

From the foregoing it will be seen that I provide very simple means for shifting the cutter-bar into or out of operation at any time during the revolution of the traction-wheel from which it receives power.

In the foregoing description I have shown the preferred form of my invention; but I do not wish to limit myself thereto, as I am aware that modifications may be made therein without departing from the spirit or sacrificing the advantages thereof, and I therefore reserve the right to make such changes as fairly fall within the scope of my invention.

Having thus fully described the invention, what I claim is—

The combination with a cutter-bar-operating shaft having a pinion thereon; of an internally-toothed traction-wheel, a longitudinally-movable power-shaft, a gear thereon meshing with the teeth in the traction-wheel, a pinion upon said power-shaft, a spring adapted to hold said pinion and the pinion of the cutter-bar-operating shaft normally in mesh, a collar upon the power-shaft, a revoluble spindle at right angles to said shaft, an eccentric thereon adapted to bear upon the collar and impart longitudinal movement thereto and to the power-shaft, a ratchet-wheel upon the spindle, and a spring-pawl engaging said wheel and adapted to prevent movement of the eccentric in one direction.

In testimony whereof I affix my signature in presence of two witnesses.

EUGENE B. FISK.

Witnesses:
R. H. PIGUE,
I. H. LOVELL.